United States Patent Office 3,424,940
Patented Jan. 28, 1969

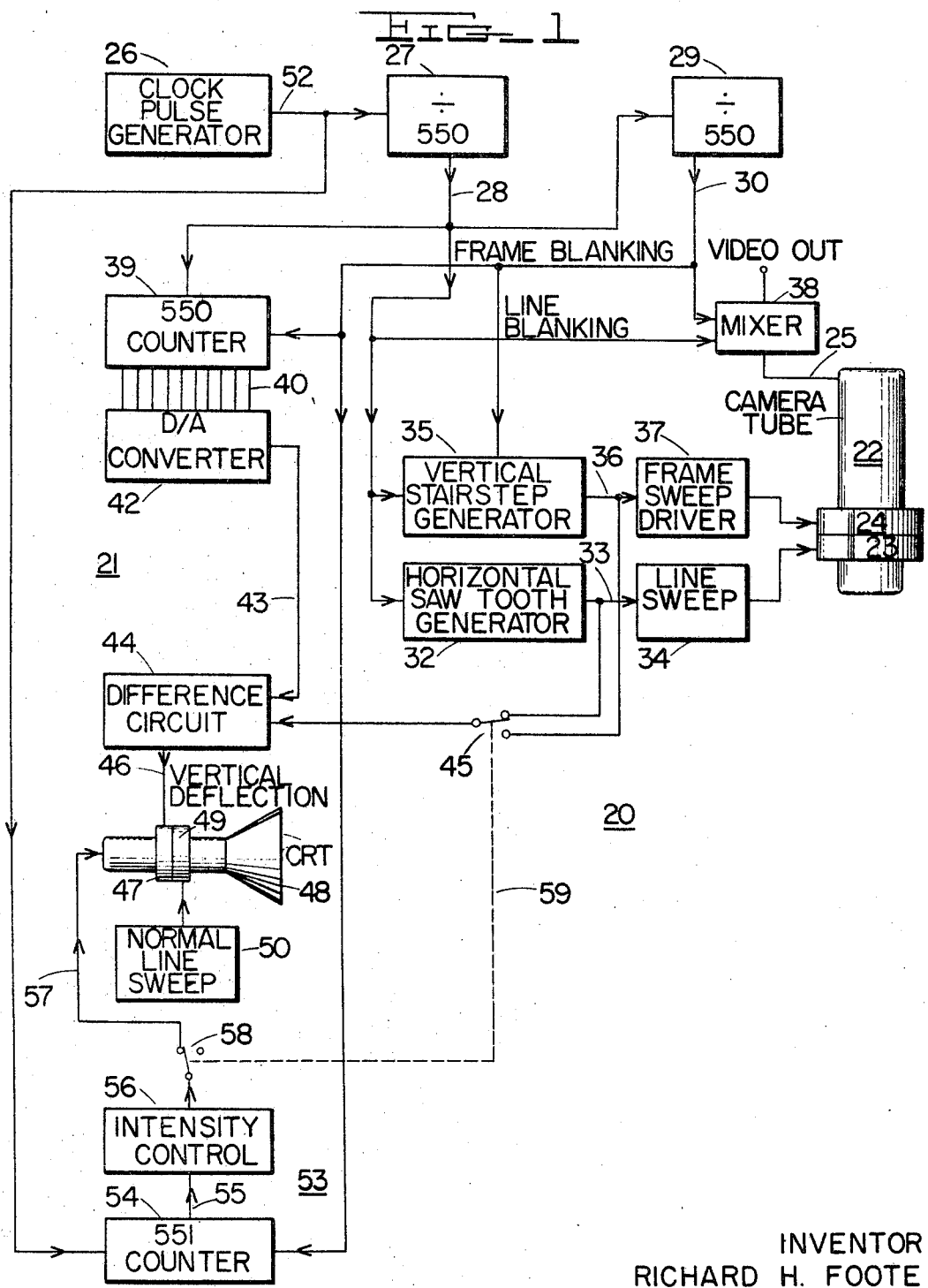

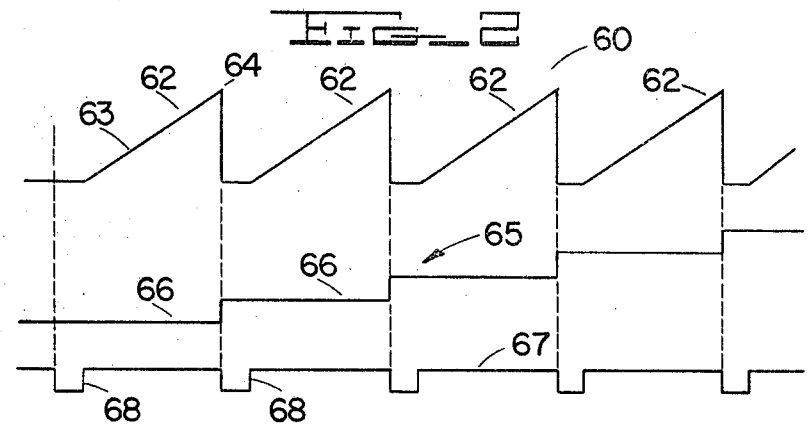
FIG_2
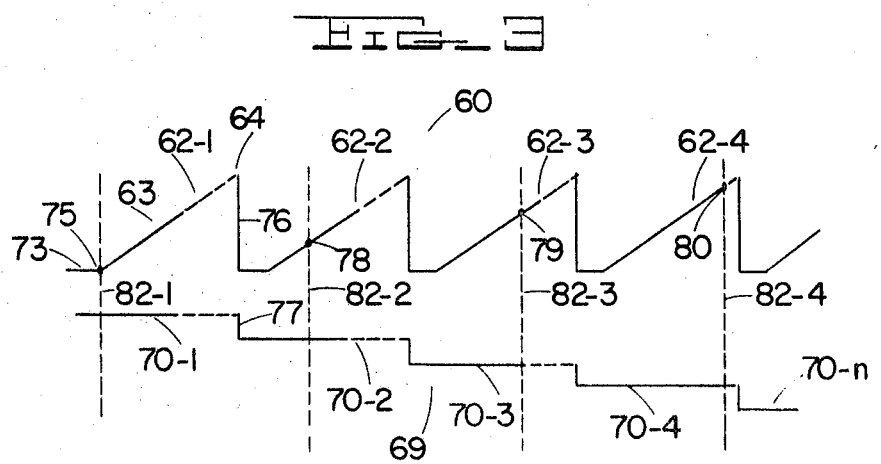
FIG_3
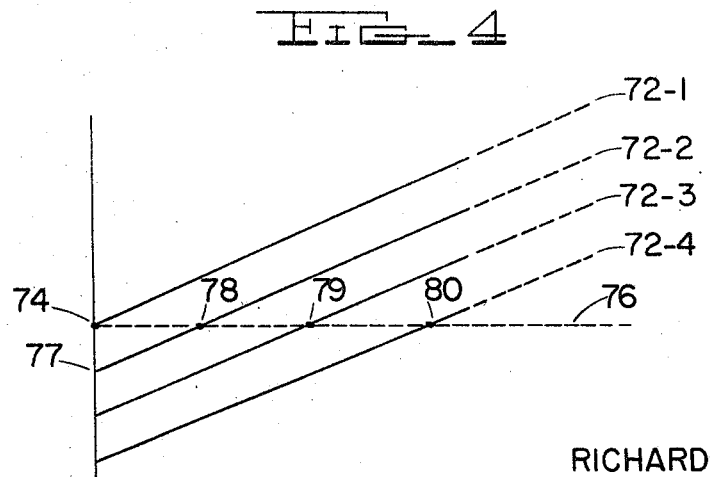
FIG_4
INVENTOR
RICHARD H. FOOTE
ATTORNEYS

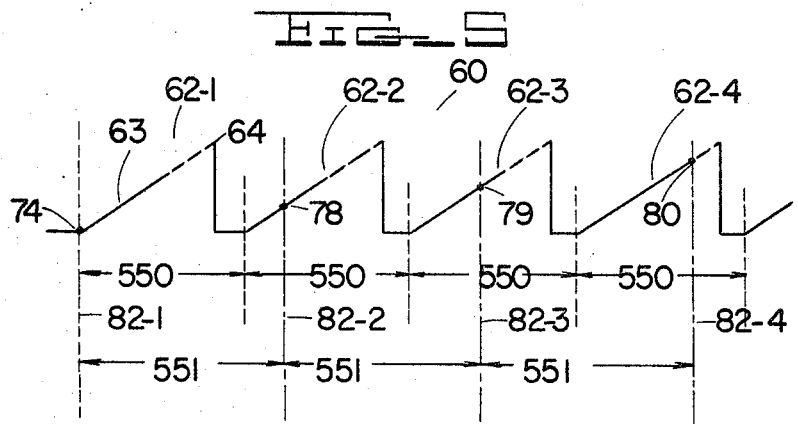
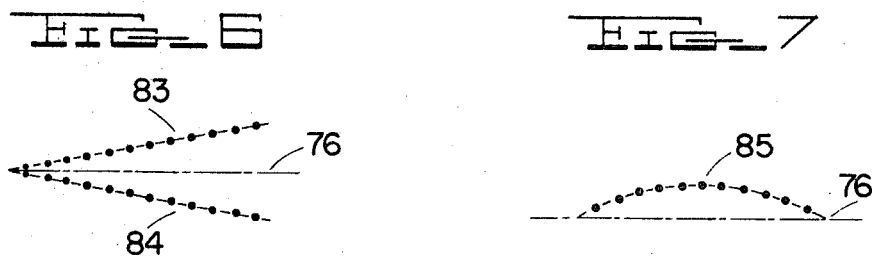
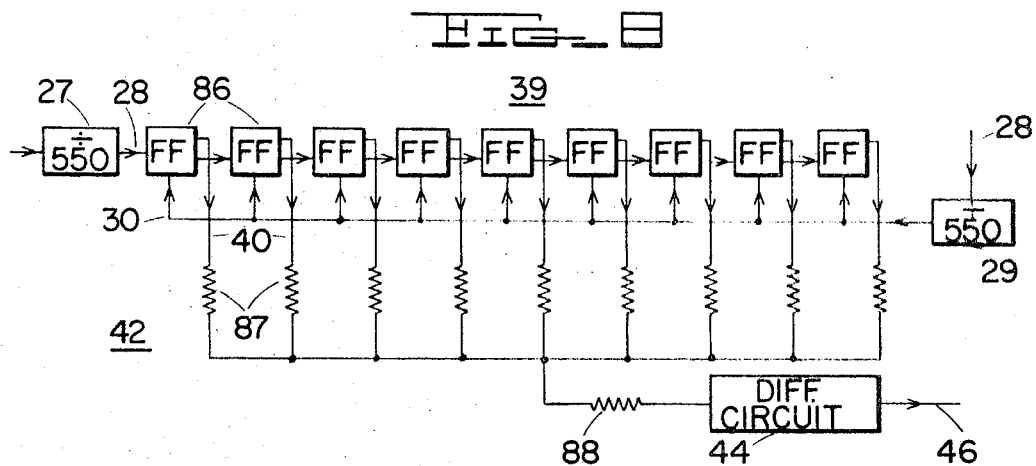

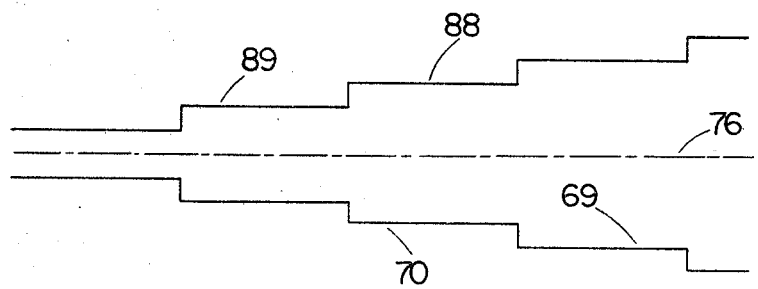
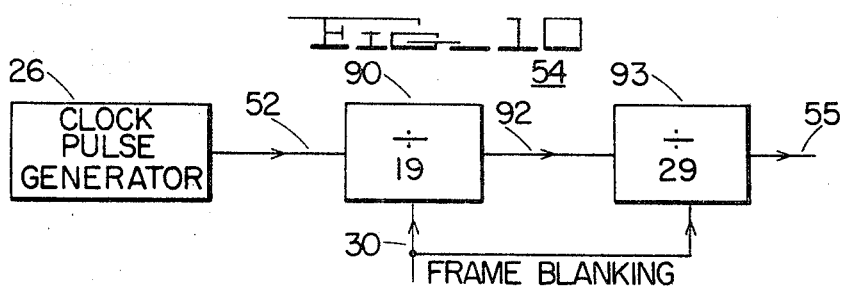
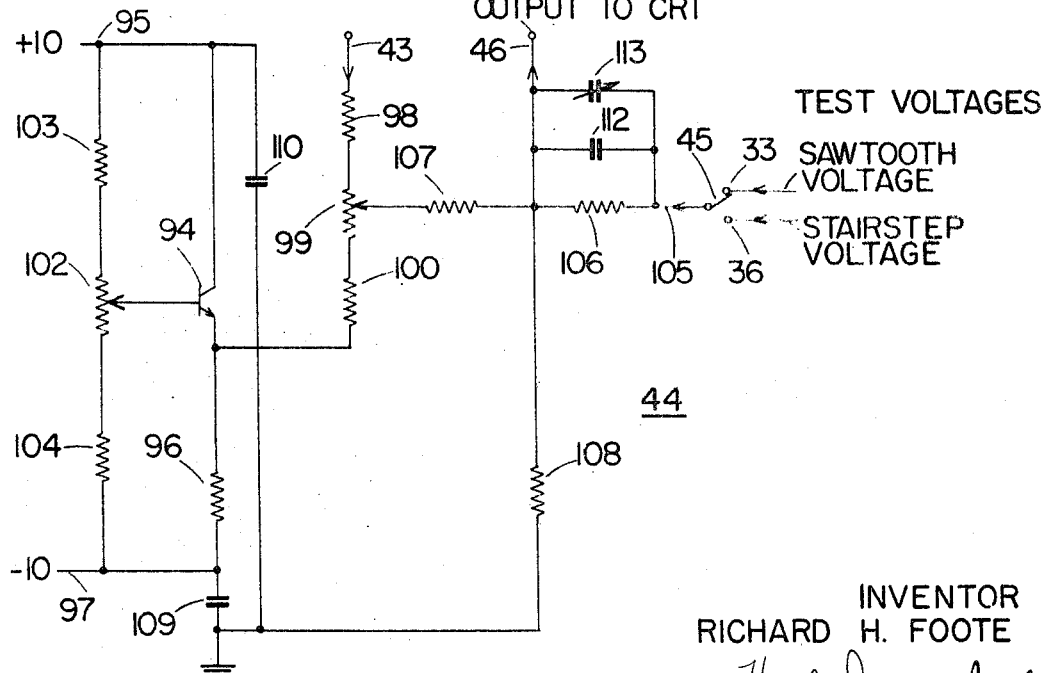

3,424,940
APPARATUS AND METHOD FOR TESTING
LINEARITY OF A SAWTOOTH WAVEFORM
SIGNAL
Richard H. Foote, Fort Wayne, Ind., assignor to International Telephone and Telegraph Corporation, Nutley, N.J., a corporation of Delaware
Filed June 15, 1966, Ser. No. 557,827
U.S. Cl. 315—27      29 Claims
Int. Cl. H01j 29/70

ABSTRACT OF THE DISCLOSURE

A system for testing the linearity of a sawtooth signal wherein a reference stairstep signal is generated, each step being in phase with, and of a duration equal to, one sawtooth signal, the stairstep signal having a maximum amplitude equal to the maximum amplitude of each sawtooth signal. The two signals are applied to a difference circuit generating a train of difference signals. Each of the difference signals is sampled at a predetermined point, each point being on a successive step of the stairstep signals, and each point having an amplitude equal to the amplitude of the corresponding point of the sawtooth signal. The sampled difference signals are displayed on an oscilloscope and fall in a straight line when the sawtooth signals are linear.

---

This invention relates generally to testing apparatus and methods for electronic equipment, such as television camera tube systems, and more particularly to an apparatus and method for testing the linearity of sawtooth waveform signals, such as those employed for line sweep voltages in television camera tube systems.

There are certain television camera tube systems in which a relatively fast, i.e., on the order of 5 to 20 kilocycles, very precise sawtooth waveform sweep voltage signal is required for line scanning, it being required that the linearity of such sawtooth waveform signals be accurate within .05 percent. The term "linearity" as applied to a sawtooth waveform signal has reference to the change of amplitude of the signal with respect to time, e.g., for each unit of time it is desired that the amplitude of the sawtooth waveform signal change by the same amount.

It is therefore desirable to provide an apparatus and method to test a sawtooth waveform line sweep signal to determine whether its linearity is within the prescribed limits of accuracy, however, to the best of the present applicant's knowledge, no devices or systems are presently commercially available for making such a test at the scanning rates involved, and the high degree of accuracy required precludes the checking of linearity by mere visual inspection.

It is therefore desirable to provide apparatus for testing the linearity of a sawtooth waveform signal.

Another object of the invention is to provide a method of testing the linearity of the sawtooth waveform signal.

The apparatus of the invention for testing the linearity of a sawtooth waveform signal, in its broader aspects, incorporates means for generating a reference stairstep waveform signal having each step in phase with and of a duration equal to one sawtooth signal, the stairstep signal being inverted with respect to the sawtooth signal. Means are provided for generating a train of difference signals in a response to the difference in the amplitudes of the sawtooth and stairstep signals and means are provided for displaying the difference signals. In the preferred embodiment of the apparatus of the invention wherein the maximum amplitude of the stairstep signal is substantially equal to the desired maximum amplitude of each sawtooth signal, means are provided for sampling each of the difference signals at a predetermined point thereon, each of the points being at an amplitude level on a respective step of the stairstep signal which is substantially equal to the desired amplitude of the respective sawtooth signal, and means are provided coupled to the displaying means for displaying the sampled difference signals, the displayed sampled difference signals thus falling in a straight line when the sawtooth signals are linear.

The above-mentioned and other features and objects of this invention and the manner of attaining them will become more apparent and the invention itself will be best understood by reference to the following description of an embodiment of the invention taken in conjunction with the accompanying drawings, wherein:

FIG. 1 is a schematic diagram of a television camera tube system incorporating the linearity testing apparatus of the invention;

FIG. 2 is a diagram showing the waveforms of the line and frame sweep voltages applied to the camera tube of FIG. 1;

FIG. 3 is a diagram showing the waveform of the signals applied to the difference circuit of the linear testing apparatus of FIG. 1 and also showing the points at which the difference signals are sampled;

FIG. 4 is a diagram showing the sampled difference signals displayed on the cathode ray tube of the linearity testing apparatus of FIG. 1;

FIG. 5 is a diagram useful in explaining the mode of operation of the sampling circuit of the linearity testing apparatus of FIG. 1;

FIG. 6 is a diagram showing the display on the cathode ray tube of FIG. 1 in response to linear sawtooth waveform sweep signals which, however, are too high and too low in amplitude;

FIG. 7 is a diagram showing the display on the cathode ray tube of FIG. 1 and the response to sawtooth waveform signals which are non-linear but which have the desired amplitude;

FIG. 8 is a schematic diagram showing the "550" counter and digital-to-analog converter of the linearity testing apparatus of FIG. 1;

FIG. 9 is a diagram showing waveforms employed in the linearity testing apparatus of FIG. 1 for testing the linearity of the stairstep frame sweep voltage applied to the camera tube;

FIG. 10 is a schematic diagram showing the sampling circuit of the linearity testing apparatus of FIG. 1; and FIG. 11 is a schematic diagram showing the difference circuit of the linearity testing apparatus of FIG. 1.

Referring now to FIG. 1 of the drawings, there is shown a television camera tube system, generally indicated at 20, incorporating the linearity testing apparatus of the invention, generally indicated at 21. The camera tube system comprises a conventional television camera tube 22 having vertical and horizontal deflection elements 23 and 24, and a video signal output circuit 25.

In order to provide line and frame sweep signals, a clock pulse generator 26 is provided for generating a continuous train of clock pulses. Clock pulse generator 26 is coupled to conventional pulse counting apparatus 27, which may be a conventional bistable multivibrator counting chain, which provides line blanking pulse in response to a predetermined number of clock pulses; in the illustrated embodiment, one line blanking pulse is generated for each 550 clock pulses. The line blanking pulse output circuit 28 of the pulse counting circuit 27 is coupled to another conventional pulse counting circuit 29, such as a similar conventional bistable multivibrator counting chain, which provides in its output circuit 30 a frame blanking pulse in response to a predetermined number of line blanking pulses; in the illustrated embodiment, one frame blanking pulse is provided in response to each 550 line blanking pulses.

The line blanking pulse output circuit 28 of the counting circuit 27 is coupled to a conventional horizontal sawtooth waveform voltage generator 32 which generates one sawtooth waveform sweep voltage signal in response to each line blanking pulse. The output circuit 33 of the horizontal sawtooth generator 32 is coupled to a conventional line sweep driver 34 which is in turn coupled to the horizontal deflection element 23 of the camera tube 22. In the illustrated embodiment, a stairstep function voltage is employed for the frame sweep signal for the camera tube 22 and thus the line blanking pulse output circuit 28 of the counting circuit 27 is coupled to a conventional stairstep voltage function generator 35 which has its output circuit 36 coupled to a conventional frame sweep driver 37, the frame sweep driver 37 in turn being coupled to the vertical deflection element 24 of the camera tube 22. Thus, each line blanking pulse actuates the vertical stairstep function generator 35 to generate the next successive level or step in the stairstep frame sweep voltage signal. Frame blanking pulse output circuit 30 of the counting circuit 29 is also coupled to the vertical stairstep function generator 35 for resetting the same at the end of one complete frame.

Output circuit 25 of the camera tube 22 together with the line and frame blanking signal output circuits 28, 30 are coupled to a conventional mixing circuit 38 for superimposing the line and frame blanking signals on the video signal in conventional fashion.

The linearity testing apparatus 21 of the invention comprises a bistable multivibrator counting chain 39 coupled to the line blanking pulse output circuit 28 for counting the line blanking pulses up to the predetermined number of line blanking pulses which provide one frame blanking pulse, i.e., 550 in the illustrated embodiment. Counting chain 39 is provided with a plurality of output circuits 40, nine in the illustrated embodiment, in which binary coded signals are provided in response to the pulse count. While such bistable multivibrator counting chains providing a binary coded pulse count output are well known in the art, one form which may be employed is schematically shown in FIG. 8. The frame blanking pulse output circuit 30 of the counter 29 is coupled to the counting chain 39 resetting the same at the end of each frame. The binary coded pulse output circuits 40 of the counting chain 39 are coupled to a conventional digital-to-analog converter 42 which converts the binary coded signals provided by the counting chain 39 to analog form, i.e., a reference stairstep function voltage. In the illustrated embodiment, in which a stairstep function voltage is employed for the frame sweep signal for the camera tube 22, the reference stairstep function voltage provided by the digital-to-analog converter 42 is substantially identical to the desired vertical stairstep function sweep voltage but inverted with respect thereto for a reason to be hereinafter described.

The output circuit 43 of the digital-to-analog converter 42 is coupled to a difference circuit 44. A manually actuated switch 45 selectively couples the sawtooth waveform output voltage of the sawtooth generator 32 or the stairstep function output voltage of the vertical stairstep generator 35 to the difference circuit 44. Difference circuit 44 thus provides a train of difference signals in response to the difference in amplitudes of the reference stairstep voltage applied thereto from the digital-to-analog converter 42 and the sweep voltage applied thereto from the horizontal sawtooth generator 32 or the vertical stairstep generator 35. Output circuit 46 of the difference circuit 44 is coupled to the vertical deflection element 47 of cathode ray tube 48. Horizontal deflection element 49 of the cathode ray tube 48 is coupled to a conventional line sweep generating circuit 50.

Output circuit 52 of the clock pulse generator 26 is also coupled to sampling circuit 53. In the illustrated embodiment, sampling circuit 53 comprises a counting circuit 54 which counts the clock pulses provided by the clock pulse generator 26 and provides one sampling pulse in its output circuit 55 in response to each 551 clock pulses, i.e., the 550 clock pulses required for the generation of one line blanking pulse plus one. Output circuit 55 of the counter 54 is coupled to a conventional beam intensity control circuit 56 which has its output circuit 57 coupled by switch 58 to the cathode ray tube 48 thereby to control the intensity of the electron beam therein. Switches 45 and 58 are ganged, as at 59, thereby to disconnect the intensity control circuit 56 from the cathode ray tube 48 when switch 45 couples the vertical stairstep function generator 35 to the difference circuit 44.

Referring now briefly to FIG. 2, the horizontal sawtooth line sweep signals provided by the sawtooth generator 32 are shown at 60 as comprising a train of sawtooth signals 62 each having a sloping rise portion 63 and a maximum amplitude 64. There is also shown in FIG. 2 the stairstep function frame sweep voltage 65 formed of equal amplitude steps 66, it being seen that each step 66 is in phase with and has the same duration as each sawtooth waveform signal 62. The train of line blanking pulses is shown at 67, each successive line blanking pulse 68 initiating the next successive sawtooth waveform signal 62 and the next successive step or level of the stairstep function frame sweep voltage 65. It will be understood that in the illustrated embodiment, there are 550 sawtooth waveform signals 62 and stairstep levels 66 in each complete frame scanned by the camera tube 22.

Referring now to the use of the linearity testing apparatus 21 to test the linearity of the sawtooth waveform line sweep voltage 60 provided by the horizontal sawtooth generator 32, and referring to FIG. 3, there is shown the train 60 of sawtooth waveform line sweep voltage signals 62 applied to the difference circuit 44, it being understood that the train 60 will actually comprise 550 sawtooth waveform signals 62 for each frame. There is also shown in FIG. 3 the inverted stairstep function voltage 69 applied to the difference circuit 44 by the digital-to-analog converter 42. It will be seen that by virtue of the energization of the counting chain 39 and the vertical stairstep generator 35 from the same source, i.e., by the line blanking pulses 68 provided by the counting circuit 27, the equal amplitude steps 70 of the stairstep function voltage 69 are likewise in phase with and of duration equal to the sawtooth waveform signals 62. It is the linearity of the sloping rise portions 63 and the maximum amplitude 64 of the sawtooth waveform signals 62 and the linearity and amplitude of the steps 66 which are to be tested by the linearity testing apparatus 21.

It will also be understood that in the illustrated embodiment there are 550 steps 70 in the reference stairstep function voltage 69 and the difference circuit 44 is arranged, as will be hereinafter more fully described, so as to adjust the amplitude level of the last stairstep function voltage 69 so that the step 70–$n$ in substantially equal in amplitude to the desired maximum amplitude 64 of the sawtooth waveform signals 62, but of course opposite in sign by reason of the fact the reference stairstep function voltage 69 is negative-going whereas the sawtooth waveform signals 62 are positive-going.

The difference circuit 44 compares the amplitude levels of the sawtooth waveform signals 62 with the steps 70 of the reference stairstep function voltage 69 thereby providing a train of difference signals 72 as shown in FIG. 4. Assuming now that the minimum amplitude 73 of the sawtooth waveform signals 62 is equal to the amplitude level of the first step 70–1 of the reference stairstep function voltage 69, it will be seen that the difference signal 72–1 at its initial point 74 coincident with the initial point 75 of the sloping rise portion 63 of the first sawtooth waveform signal 62–1 will be at a zero potential level 76, the difference signal 72–1 increasing in amplitude as the amplitude of the sawtooth waveform signal 62–1 increases.

It will further be seen that when the first sawtooth waveform signal 62–1 reaches its maximum amplitude 64 and then immediately falls, as at 76, to its minimum amplitude 73, and with the reference stairstep voltage 69 simultaneously dropping to its second step 70–2, as at 77, the difference signal will likewise drop to the level of step 72–2 since there is now an initial difference between the amplitudes of the two signals, i.e., the difference between the minimum amplitude 73 of the second sawtooth waveform signal 62–2 and the amplitude of the second step 70–2 of the stairstep function voltage 69.

The difference signals 72 provided by the difference circuit 44 are applied to the vertical deflection element 47 of the cathode ray tube 48, which has a normal line sweep provided by its own line sweep circuit 50. Thus, the display on the cathode ray tube 48 of the second difference signal 70–2 will be initiated at 77 vertically displaced downwardly from the initiation point 74 of the first difference signal 72–1, and each successive difference signal 72–3, 72–4, through 72–n, will be initiated at a successively lower point by reason of the successively lower amplitude levels of the steps 70–3, 70–4, through 70–n of the reference stairstep function voltage 69. Thus, as shown in FIG. 4, the difference signals 72 would be displayed on the cathode ray tube 48 as a plurality of vertically spaced, parallel sloping lines. However, as will now be described, the intensity of the scanning beam of the cathode ray tube 48 is controlled so that the lines responsive to the difference signals 72 are not displayed or are displayed at low intensity, the intensity of the beam being increased at predetermined points on each difference signal line 72 by the sampling circuit 73, as will now be described.

Referring still to FIGURES 3 and 4, it will be seen that point 75 at which the sloping rise portion 63 of the first sawtooth waveform signal 62–1 is initiated, is at the same potential level as the first step 70–1 of the reference stairstep function voltage 69 and thus falls on zero difference line 76, as shown in FIG. 4. Now, if the sloping rise portion 63 of the sawtooth waveform signal 62 is linear, the amplitude of the second sawtooth waveform signal 62–2 at point 78 should be equal and opposite to the amplitude of the second step 70–2 of the stairstep function voltage 69, and thus the amplitude of the difference signal 72–2 at point 78 will likewise fall on the zero difference line 76. Likewise, if the sloping rise portion 63 of the sawtooth waveform signal 62–3, 62–4 is linear, the amplitude of the third signal 62–3 at point 79 will be equal and opposite to the amplitude level of the third step 70–3 and the amplitude of the fourth signal 62–4 at point 80 will be equal and opposite to the amplitude of the fourth step. Stated differently, at each of the times indicated by the dashed lines 82–1, 82–2, 82–3 and 82–4 in FIG. 3, the amplitude of the sloping rise portion 63 of the respective sawtooth waveform signal 62–1, 62–2, 62–3 and 62–4 should be equal and opposite to the amplitude of the respective steps 70–1, 70–2, 70–3 and 70–4 of the reference stairstep function voltage 69, and if these amplitudes are equal and opposite thereby indicating the linearity of the sloping rise portion 63 of the sawtooth waveform signals 62, the difference signals 72–1, 72–2, 72–3 and 72–4 will have zero difference at those times.

The sampling circuit 53 is arranged to actuate the intensity control circuit 56 at the respective times 82 thereby momentarily to brighten the intensity of the beam of the cathode ray tube 48. Thus, if in fact the amplitudes of the sawtooth waveform signals 62–1, 62–2, 62–3 and 62–4 through 62–n are equal and opposite to the levels of the respective steps 70–1, 70–2, 70–3 and 70–4 through 70–n at these times, a row of spots 74, 78, 79, 80 will appear on the screen of the cathode ray tube 48, these spots being in a horizontal line 76 thereby indicating that the sawtooth waveform signals 62 are linear and of the proper amplitude; it will be readily understood that the spots 74, 78, 79, 80 et seq. are actually samples or segments of the difference signal lines 72–1, 72–2, 72–3 and 72–4 through 72–n.

It will now be understood that with the reference stairstep voltage 69 having $n$ steps 70 (550 in the illustrated embodiment) and having its last step 70–n at substantially the same amplitude level as the desired final amplitude level 64 of the sawtooth waveform signal 62 (but of opposite sign), if each sawtooth waveform signal 62 is considered to be formed of $n$ increments, and if the sawtooth waveform signal is linear and has the desired final amplitude 64, the increase in amplitude of the sloping rise portion 63 of each sawtooth waveform signal 62 during each increment will be equal to the increase in amplitude (but of opposite sign) of the corresponding step 70 of the reference step voltage 69, and likewise, the amplitude of the sloping rise portion 63 of each sawtooth waveform signal 62 at the end of an increment will be equal to the amplitude of the corresponding step 70 of the reference stairstep voltage 69 (but of opposite sign). Thus, if for example, the reference stairstep voltage 69 has ten steps 70 with the amplitude level of its final step being minus 10 volts, the ten steps will have one volt increments. Thus, if the sloping rise portion 63 of the sawtooth waveform signal 62 is considered to be divided into ten increments, each increment will increase one volt and the amplitude level of each step 70 will be the same as the corresponding increment of the sawtooth waveform signal 62, i.e., the amplitude level of the fifth step 70 will be minus 5 volts and the amplitude of the sloping rise portion 63 of the sawtooth waveform signal 62 in the end of the fifth increment would be plus 5 volts.

It will therefore be seen that if the sampling times 82 have a period equal to the number of steps of the reference stairstep voltage 69 (and thus equal to the number of the increments of the sawtooth waveform signal 62) plus one, the desired amplitude of the sloping rise portion 63 of the sawtooth waveform signal 62 at that point, if the sawtooth waveform signal is linear and of proper amplitude, will be equal and opposite to the level of the corresponding step 70 of the reference stairstep voltage 69.

In the illustrated embodiment in which each sawtooth waveform signal 62 and step 70 of the reference stairstep voltage 69 is generated by one line blanking pulse 68 which in turn is generated by a 550 clock pulses 26, it will be seen that each sawtooth waveform signal 62 is properly considered to be formed of 550 increments. Thus, the sampling times 82 in the illustrated embodiment have a period of 551 clock pulses, i.e., one more than the 550 clock pulse increments forming the sawtooth waveform signals 62, as shown in FIG. 5. "551" counter 54 thus counts the clock pulses provided by the clock pulse generator 26 and provides a sampling signal to the intensity control 56 in response to each 551 clock pulses.

Referring briefly to FIG. 6, it will be seen that if sawtooth waveform signal 62 is linear but the actual amplitude 64 is too high, the line of dots formed on the screen of the cathode ray tube 47 will be straight but inclined upwardly, as shown at 83, where as if the sawtooth waveform signals are linear but have less than the desired amplitude, the line of dots will be straight but inclined downwardly, as shown at 84. Referring now briefly to FIG. 7, it will be seen that if sawtooth waveform signal 62 has the desired maximum amplitude 64 but their sloping rise portions 63 are non-linear, the line of dots will begin and end on the zero difference line 76, but will be curved as shown at 85.

Referring now to FIG. 8, the "550" counter 39 and the digital-to-analog converter 42 is shown in its simplest form. Here, the "550" counter 39 comprises a counting chain formed of nine conventional bistable multivibrators 86, the first bistable multivibrator being coupled to the line blanking pulse output circuit 28 of the counting circuit 27. The pulse count output circuits 40 of the nine bistable multivibrators 86 are respectively coupled to resistors 87 which form the digital-to-analog converter 42, it being understood that the resistors 87 are binary weighted so as to provide the requisite analog voltage, i.e., stairstep voltage across the common resistor 88 which is coupled to the input circuit of the difference circuit 44. Bistable multivibrators 86 are reset at the end of a frame by a frame blanking pulse applied by the output circuit 30 of the counting circuit 29 to the reset circuits of the individual bistable multivibrators. It will be understood that digital-to-analog converters are commercially available in which the count output circuit 40 actuates solid state switches which in turn couple precision resistors in the proper combinations to provide the desired analog output voltage. Such digital-to-analog converters are capable of providing extremely precise analog output voltages which can be measured precisely by a conventional high precision electronic volt meter. Thus, the accuracy of measurement of the linearity of the relatively high frequency sawtooth waveform signals 62 is determined by the accuracy of the digital-to-analog converter 42, which in turn is determined by the accuracy of measurement of electronic volt meters which do have an accuracy within the prescribed linearity tolerance above-mentioned.

Referring briefly to FIG. 9, it will readily be seen that the accuracy of the linearity of the vertical stairstep frame sweep voltage 88 generated by the vertical stairstep generator 35 can be tested by comparing it in the difference circuit 44 with the reference stairstep voltage 69, the stairstep frame sweep voltage 88 being desirably identical to the reference stairstep voltage 69 but inverted with respect thereto, i.e., of opposite polarity. Thus, if the stairstep frame sweep voltage 88 is in fact linear and having each step 89 of the proper amplitude, there will be a zero difference output from the difference circuit 44 and the resultant display on the cathode ray tube 48 will be the zero difference line 76. For this reason, in testing the linearity of the vertical stairstep voltage 88, it is not necessary to employ the sampling circuit 53; thus switch 58 is provided ganged with switch 45 to disconnect the sampling circuit 53 and intensity control 56 from the cathode ray tube 48.

Referring now briefly to FIG. 10, the "551" counter 54 of the sampling circuit 53 may comprise a conventional counting circuit 90 which counts-down the clock pulses provided by clock pulse generator 26 and provides in its output circuit 92 a single pulse in response to each nineteen clock pulses, and another conventional counting circuit 93 which counts the output pulses from the counting circuit 90 and provides the resultant sampling pulse in its output circuit 55 in response to 29 output pulses from the counting 90. It will be seen that as a result of the two "nineteen" and "twenty-nine" counters 90, 93, one sampling pulse will be provided in response to each 551 clock pulses.

Referring now to FIG. 11, the difference circuit 44 comprises a transistor 94 having its collector connected to a positive source of potential 95, i.e., plus 10 volts in illustrated embodiment, and having its emitter connected by resistor 96 to a negative source potential 97, i.e., minus 10 volts in the illustrated embodiment. Output circuit 43 from the digital-to-analog converter 42 is coupled to the emitter of the transistor 94 by resistor 98, potentiometer 99 and resistor 100. The base of transistor 94 is connected to the adjustable element of potentiometer 102 which is series connected with resistors 103 and 104 between the positive and negative sources 95, 97.

Switch 45 selectively connects the test voltages, i.e., the sawtooth waveform voltage from output circuit 33 of the horizontal sawtooth generator 32 or the stairstep frame sweep voltage from the output circuit 36 of the vertical stairstep generator 35, to test voltage input circuit 105 which is series connected with the adjustable element of potentiometer 99 by resistors 106 and 107. The output circuit 46 is taken from the mid-point between resistors 106 and 107 which is also connected to ground by resistor 108. Capacitors 109, 110 respectively couple the negative and positive supply lines 97, 95 to ground. Capacitor 112 and variable capacitor 113 are connected in parallel across resistor 106.

Transistor 94 and its associated resistors serve as a centering circuit to adjust the direct current level of the difference signal for centering the display on the cathode ray tube 48, potentiometer 102 providing this adjustment. Potentiometer 99 provides adjustment of the amplitude of the difference signal. It will be observed that the difference circuit 44 is a mixing circuit and that other conventional difference circuits, such as conventional differential amplifier circuits, may be employed.

It will be observed that the testing apparatus of the invention utilizes a difference signal, i.e., the output of the difference circuit 44, this difference signal being close to ground potential so that substantial gain may be employed in the cathode ray tube 48. It will also be readily seen that it is possible to stop the counting of the "551" counter 54 and accurately to measure the amplitude of the sawtooth waveform signal 62 at any desired point, i.e., it is possible to set counter 54 so that say the fiftieth increment is examined to determine the linearity of that point. Thus, in accordance with system of the invention, it is possible to make a point-by-point examination of the linearity of the sawtooth waveform signal. It will further be seen that by reason of the fact that the reference stairstep voltage 69 is generated in digital-to-analog fashion, it is possible for calibration purposes to step the digital-to-analog converter 42 slowly and to measure each of the voltage steps with a precision electronic volt meter. The intensity control circuit 56 is employed to amplify the low voltage logic pulse provided in the output circuit 55 of the counter 54, i.e., 10 volts in the illustrated embodiment, to provide a high intensity pulse for brightening the display on the cathode ray tube 48.

While there have been described above the principles of this invention in connection with specific apparatus, it is to be clearly understood that this description is made only by way of example and not as a limitation to the scope of the invention.

What is claimed is:

1. In a television camera tube system comprising a camera tube having a vertical and horizontal beam deflection means, means for generating a train of sawtooth waveform line sweep voltage signals, means for generating a train of sweep voltage signals, and means coupling said generating means to said deflection means; apparatus for testing the linearity of said sawtooth waveform voltage signals comprising means for generating a reference stairstep waveform voltage signal having each step in phase with and of a duration equal to one said sawtooth signal, and means for generating a train of difference signals responsive to the voltage difference between said train of sawtooth signals and said stairstep signal.

2. The system of claim 1 further comprising means for displaying said difference signals.

3. The system of claim 1 further comprising means for sampling each of said difference signals at a predetermined point thereon, and oscilloscope means for dispaying said sampled difference signals.

4. The system of claim 3 wherein said sampling means includes means for sampling successive difference signals at successively later points thereon.

5. The system of claim 3 wherein said sampling means includes means for generating a train of sampling signals and means for sampling successive difference signals in response to said sampling signals, said sampling signals having a period different than the period of said sawtooth signals whereby said displayed sampled difference signals fall in a straight line when said sawtooth signals are linear.

6. The system of claim 5 wherein said stairstep signal is inverted with respect to said sawtooth signal, the period of said sampling signals being greater than that of said sawtooth signals and such that the desired voltage of each successive sawtooth signal at said point is substantially equal to the voltage level of the respective stairstep signal.

7. The system of claim 3 wherein said sampling means includes means for generating a train of sampling signals, and means for brightening the intensity of the display of said oscilloscope means in response to said sampling signals.

8. The system of claim 3 wherein said stairstep signal is inverted with respect to said sawtooth signals, and the maximum amplitude of said stairstep signal is substantially equal to the desired maximum amplitude of each said sawtooth signal.

9. The system of claim 3 wherein there are a predetermined number of lines in each frame, each said sawtooth signal having a number of increments equal to said predetermined number, said sampling means including means for generating a train of sampling signals and means for sampling successive difference signals in response to said sampling signals having a period equal to said number of increments plus one whereby said displayed sampled difference signals fall in a straight line when said sawtooth signals are linear.

10. The system of claim 9 wherein said stairstep signal is inverted with respect to said sawtooth signal, the maximum amplitude of said stairstep signal being substantially equal to the desired maximum amplitude of each said sawtooth signal, said sampling means including means for brightening the intensity of the display of said oscilloscope means in response to said sampling signals.

11. The system of claim 10 wherein said frame sweep voltage is a stairstep voltage desirably substantially identical to said reference stairstep signal but inverted with respect thereto, and further comprising means for selectively coupling said line sweep signal generating means and said frame sweep signal generating means to said difference signal generating means thereby selectively to test the linearity of both of said sweep voltage signals.

12. The system of claim 1 wherein said line sweep signal generating means includes means for generating a train of line blanking signals, and means for generating each said sawtooth signal in response to a said line blanking signal, there being a predetermined number of said line blanking signals in a frame, and wherein said reference signal generating means includes binary counting means for counting said line blanking signals up to said predetermined number and for providing binary coded signals in response thereto, and digital-to-analog converting means for converting said binary coded signals to said stairstep signal.

13. The system of claim 12 wherein said line sweep signal generating means further includes means for generating a train of clock pulses and for generating each said line blanking signal in response to a predetermined number of said clock pulses, said predetermined number of clock pulses and line blanking pulses being equal, said stairstep signal being inverted with respect to said sawtooth signals, the maximum amplitude of said stairstep signal being substantially equal to the desired maximum amplitude of each of said sawtooth signals, and further comprising oscilloscope means for displaying said difference signals, means for counting said clock pulses and for generating a sampling signal in response to said predetermined numbers of clock pulses plus one, and means for brightening the intensity of the display of said oscilloscope means in response to said sampling signals.

14. The system of claim 13 wherein said oscilloscope means includes line and frame deflection means, said frame deflection means being coupled to receive said difference signals, and further comprising other line sweep signal generating means coupled to said line deflection means of said oscilloscope means.

15. The system of claim 1 wherein said line sweep signal generating means includes means for generating a train of clock pulses, means for generating a train of line blanking signals respectively responsive to a predetermined number of said clock pulses, and means for generating each said sawtooth signal in response to a said line blanking signal, and further comprising oscilloscope means for displaying said difference signals, means for counting said clock pulses and for generating a sampling signal in response to a predetermined number of said clock pulses, and means for gating said oscilloscope means to display said difference signals in response to said sampling signals.

16. The system of claim 15 wherein said sampling signals are generated in response to a number of said clock pulses different from said first-named predetermined number.

17. The system of claim 15 wherein said stairstep signal is inverted with respect to said sawtooth signals, the maximum ampliture of said stairstep signal being substantially equal to the desired maximum amplitude of each said sawtooth signal, and wherein said first-named predetermined number of clock pulses is such that said oscilloscope means is gated during each said sawtooth signal at a point thereon where the desired amplitude is substantially equal to the amplitude of the respective step of said stairstep signal.

18. The system of claim 17 wherein there are a predetermined number of lines in each frame equal to the number of said sawtooth signals in a line, and wherein said counting means generates said sampling signals respectively responsive to said first-named predetermined number of clock pulses plus one.

19. Apparatus for testing the linearity of a sawtooth waveform signal comprising means for generating a reference stairstep waveform signal having each step in phase with and of a duration equal to one said sawtooth signal, said stairstep signal being inverted with respect to said sawtooth signal, means for generating a train of difference signals in response to the difference between the amplitude of said sawtooth and stairstep signals, and means for displaying said difference signals.

20. The apparatus of claim 19 further comprising means for sampling each of said difference signals at a predetermined point thereon, and means coupled to said displaying means for displaying said sampled difference signals.

21. The apparatus of claim 20 wherein the maximum amplitude of said stairstep signal is substantially equal to the desired maximum amplitude of each of said sawtooth signal, each of said points being at an amplitude level on a respective step of said stairstep which is substantially equal to the desired amplitude of the respective sawtooth signal whereby said displayed sampled difference signals fall in a sraight line when said sawtooth signals are linear.

22. The apparatus of claim 21 wherein there are a predetermined number of equal amplitude steps in said stairstep signal, each of said sawtooth signals having a number of increments equal to said predetermined number, said sampling means including means for generating a train of sampling signals having a period equal to that of said sawtooth signal plus one said increment, and means for gating said recording displaying means in response to said sampling signals.

23. The apparatus of claim 22 wherein said sampling signal generating means includes means for generating a train of clock pulses having a period equal to the duration of said increments, and means for counting said clock pulses up to said predetermined number plus one and generating said sampling signal in response thereto.

24. The apparatus of claim 23 wherein said sawtooth signal is generated in response to a line blanking signal and said stairstep signal generating means includes means for counting said line blanking signals up to said predetermined number and for providing binary coded signals in response thereto, and digital-to-analog converting means for converting said binary coded signals to said stairstep signals.

25. The method of testing the linearity of a train of sawtooth waveform signals comprising the steps of generating a stairstep waveform signal inverted with respect to said sawtooth signals and with each step thereof in phase with and of duration equal to one said sawtooth signal, and comparing said sawtooth and stairstep signals at one point during each step of said stairstep signal.

26. The method of claim 25 wherein the maximum amplitude of said stairstep signal is substantially equal to the desired maximum amplitude of said sawtooth signals, each said point being at an amplitude level of the respective step of said stairstep signal which is substantially equal to the desired amplitude of the respective sawtooth signal.

27. The method of claim 26 wherein said comparing step includes the step of generating a train of signals responsive to the difference in the amplitudes of said sawtooth and stairstep signals, and comprising the further step of displaying said difference signals at each said point.

28. The method of claim 25 wherein said comparing step includes the step of generating a train of signals responsive to the difference in the amplitudes of said sawtooth and stairstep signals.

29. The method of claim 28 comprising the further step of displaying said difference signals at each said point.

References Cited

UNITED STATES PATENTS

| 3,250,993 | 5/1966 | Weaver | 324—77 |
| 3,244,989 | 4/1966 | Carlson | 328—146 X |
| 2,951,181 | 8/1960 | Sugarman | 324—77 X |

RODNEY D. BENNETT, *Primary Examiner.*

C. L. WHITHAM, *Assistant Examiner.*

U.S. Cl. X.R.

324—077; 328—148